United States Patent [19]

Albertson

[11] 4,403,047

[45] Sep. 6, 1983

[54] ASBESTOS-FREE FRICTION MATERIAL

[75] Inventor: Clarence C. Albertson, Villa Park, Ill.

[73] Assignee: Borg-Warner Corporation, Chicago, Ill.

[21] Appl. No.: 182,736

[22] Filed: Aug. 29, 1980

[51] Int. Cl.³ .............................................. C08L 61/10
[52] U.S. Cl. .................................... 523/153; 523/155; 523/156; 524/494
[58] Field of Search ....................... 523/153, 155, 156; 524/494

[56] References Cited

U.S. PATENT DOCUMENTS

| 3,967,037 | 6/1976 | Marzocchi et al. | 428/392 |
| 4,130,537 | 12/1978 | Bohrer | 428/273 |
| 4,145,223 | 3/1979 | Iwata | 523/153 |
| 4,226,758 | 10/1980 | Sumira | 523/153 |

FOREIGN PATENT DOCUMENTS 2083060  3/1982  United Kingdom ................ 523/155

Primary Examiner—Lewis T. Jacobs
Attorney, Agent, or Firm—Joseph Shekleton

[57] ABSTRACT

An asbestos-free friction material containing "soft" glass fibers. The friction material, in a clutch or brake apparatus, is characterized by unusually smooth, quiet, vibrationless operation.

10 Claims, No Drawings

ASBESTOS-FREE FRICTION MATERIAL

This invention relates as indicated to an asbestos-free friction material. More particularly it relates to a friction material containing a fiberizable glass composition which is characterized by low hardness and is, therefore, especially adapted for such use.

Present day frictional materials invariably incorporate asbestos as an important component. The reason for this is that asbestos is characterized by many of the properties which are useful in the formulation of a good frictional material such as a brake lining or clutch surface. It is chemically inert, it is fibrous, it has about the right degree of hardness, the right coefficient of friction with ferrous metals, and it is cheap. For these reasons, asbestos has been a mainstay of frictional materials in industry in general and in particular, in the automotive industry.

In the recent past, however, the continued use of asbestos has come under a cloud because of the realization that it presents a serious cancer hazard for those who work with it. There has been an increasing concern about such hazard with the result that the expense of health precautions now required for the safe handlling of asbestos has become a significant burden. Accordingly, it has now become desirable to eliminate asbestos from frictional material formulations and to find a replacement.

U.S. Pat. No. 3,844,800 (Hooten) discloses an invention which is related to frictional materials used in braking loads having considerable ranges of kinetic energy. Those frictional materials contain 25–80% by volume of a metallic powder which may be copper, iron, nickel or mixtures thereof, up to 30% by volume of aluminum oxide, crystalline silicon oxide, mullite, kyanite, sillimanite, cordierite, forsterite or mixtures thereof, up to 32% by volume of graphite and 1–50% by volume of silicate glass powder particles. A soda-lime glass is shown (in Table IA) having 72% silica, 15% sodium oxide, 9% of calcium oxide and small proportions of potassium oxide and magnesium oxide.

U.S. Pat. No. 3,967,037 (Marzocchi et al) shows a friction material which comprises glass fibers bonded together by a cured organic binder and a binder modifying agent. The glass fibers are of relatively short length and are randomly oriented. There is no suggestion, however, that glass fibers of low hardness would be useful.

U.S. Pat. No. 4,130,537 (Bohrer) shows an asbestos-free friction material in which glass fibers are present as an active friction ingredient. Any of certain infusible organic fibers such as cotton, jute, hemp, sisal, wool, viscose, rayon, aramid fibers, etc. are present also. The ratio of glass fiber to infusible organic fiber is critical and within such ratio the resulting friction element is free of ordinarily characteristic "aggressiveness," i.e., a tendency during use to noise, vibration and erratic friction effect.

U.S. Pat. No. 4,118,528 (Lowry) shows a frictional facing comprising glass fibers bonded with a heat-curable rubber, a resin and various friction modifiers. The rubber is a vulcanizable carboxy nitrile rubber and the resin is a water-soluble, low molecular weight, one-step thermosetting phenolformaldehyde resin. The glass fibers are impregnated with rubber, resin and furnace black prior to application of the heat-curable composition above. Nothing is said about the composition of the glass itself.

U.S. Pat. No. 3,743,069 (Barnett et al) shows a frictional surface comprising continuous bundles of continuous glass fibers impregnated with a heat-curable cement.

Japanese Patent Publication No. 76/87,549 shows friction materials prepared by mixing glass fibers (1–6 mm. long) with synthetic rubber, synthetic resin friction improvers and fillers, then molding and firing.

None of the above, however, say anything about the kind of glass contemplated for use in these various inventions and it must be assumed that the glass fibers therein disclosed are derived as taught by the prior art, e.g., from a composition comprising, for example, 55% silica, 10% boric oxide, 14% alumina, 17% lime and 4% magnesia. Such a glass has a Moh's hardness above 6.

The invention herein is an asbestos free friction material comprising in combination (1) a fibrous glass having a Moh's hardness of less than about 5, (2) a binder and (3) a friction modifying material. Such friction material, in a clutch or brake apparatus, for example, is characterized by unusually smooth, quiet, vibrationless operation, while at the same time its wear and friction characteristics are satisfactory. glass, S glass and G glass, is made of hard, high melting glass. It has a Moh's hardness of at least 6. It is compounded so as to give a glass having high tensile strength and good electrical properties.

Glass fibers having a wide range of compositions are available for use in the friction materials herein, it being necessary only that the glass have the required hardness and that it of course be fiberizable. Illustrative glass compositions which meet these requirements are as follows:

|  | $SiO_2$ | PbO | CaO | $Na_2O$ | $K_2O$ | $Al_2O_3$ | $B_2O_3$ | MgO |
| --- | --- | --- | --- | --- | --- | --- | --- | --- |
| No. 1 | 34 | 59 |  | 1.5 | 3.5 | 3 |  |  |
| No. 2 | 67 | 15 | 1 | 9.5 | 7.1 |  |  |  |
| No. 3 | 65 |  |  |  | 20 |  | 5 | 10 |

The hardness of the above glasses is shown below, in terms of Moh's hardness ratings and also Vickers hardness ratings. This latter is discussed in some detail in "Vickers Hardness of Glass" by Yamane et al., Journal of Non-Crystalline Solids, 15 (1974), 153–164.

|  | Moh's Hardness | Vicker's Hardness |
| --- | --- | --- |
| No. 1 | 4 | 400 kg./mm.$^2$ |
| No. 2 | 4.5 | 450 kg./mm.$^2$ |
| No. 3 | 4.5 | 440 kg./mm.$^2$ |

Silicon dioxide is the principal ingredient of all commercially important glasses because it provides strength. At the same time, however, it also provides hardness and it will be recalled that a low hardness is desired for the present invention.

The fiberizable glass composition of the present invention is, as indicated, characterized by low hardness and is, therefore, especially adapted for use as a frictional material. An especially desirable embodiment of the present invention is a friction material containing a lead-free glass having low hardness properties comprising from about 55% to about 75% of silicon dioxide, from about 15% to about 30% of potassium oxide and from about 2% to about 10% of magnesium oxide. It will be noted that there are four distinguishing characteristics of this glass: (1) it is lead-free, (2) it is fiberizable, (3) it has low hardness, and (4) it is stable to atmospheric moisture. All of these tend to make it a suitable substitute for asbestos in frictional materials.

This glass composition contains silicon dioxide as its principal ingredient. As noted above, its concentration is limited at the lower end of the scale, by the requirement for strength and at the upper end of the scale, by the requirement for low hardness. Less than a 45% concentration results in a glass having little strength while more than 75% contributes unduly to hardness. Also, too much silicon dioxide causes the melting point of the glass to be too high which makes it difficult to melt and work.

Ordinary soda glass contains a substantial proportion of sodium oxide which gives the glass a reduced melting point, but also a reduced chemical durability, i.e., increased solubility in water. Instead of sodium oxide, the lead-free glass compositions herein contain potassium oxide, which makes the glass softer. The concentration of potassium oxide should be within the range of from about 15% to about 30%. More than this is undesirable because it tends to increase the hardness; that is, the potassium oxide imparts decreased hardness up to a concentration of about 30% whereas at higher concentrations just the opposite effect is noted.

In many instances the above glass composition will contain up to about 25% of boron oxide which also is effective to provide increased chemical durability and to reduce hardness. Zinc oxide may also be used, in concentrations ranging up to about 10%.

The glass compositions of the invention include also those lead-containing glasses which have a Moh's hardness of less than about 5. Such compositions may contain up to about 70% of lead.

Fiber preparation can be accomplished either by blowing or drawing. Blown fibers, for testing purposes, are prepared by directing a blast of compressed air at a molten stream of glass. Fibers up to 12 inches long can be obtained in this fashion. Drawn fibers are simply pulled from a molten steam onto a wind-up reel. The method of preparing fibers is not a critical part of this invention and any of several well-known techniques may be employed.

The glasses herein, as indicated, are characterized by a relatively low hardness. The term "hardness" refers to the susceptibility of the glass surface to indentation when it is subjected to a diamond-pointed load of 100 grams. A 100% silicon dioxide glass has a Vicker's Hardness rating of 710 kg/cm². The glasses of the present invention have corresponding ratings less than about 550 kg/mm2.

The softening point of the glasses herein is within the range of from about 450° C. to about 625° C. The highest temperature at which a glass can be used, without risking thermal deformation of the glass surface, is generally about 75° C. below the softening point and this use requirement is an important factor in fixing the lower limit of this softening point range. The upper limit is based largely on the ease of manufacturing the glass; a low melting glass is easier to manufacture than a high melting glass simply because less heat is required. The softening point is determined on an Orton Recording Dilitomete, using a 2-inch long specimen and a heating rate of 4° C./minute. The softening point is the temperature at which the glass becomes soft enough that a push rod attached to an LVDT transducer penetrates the sample.

Durability is also a factor, i.e., the property of the glass to withstand dissolution in water. This is determined either by noting the increase in pH of a glass powder (of uniform size)-water mixture, or by noting the weight loss of a glass sample after immersion in water for a period of time. The durability of the glasses herein is equal to or superior to that of ordinary soda lime glass.

The glasses of the invention may be made in a globar electrical furnace in a platinum crucible, at temperatures up to about 1450° C. A melt time of 24 hours is satisfactory. Raw materials may be ordinary laboratory grade oxides or carbonates of the desired element, depending on availability.

The friction material binder herein is a cross-linkable polymeric material. It contains a cross-linkable resin such as a phenolic resin. The term "phenolic resin", as used herein, is intended to include thermosetting resins resulting from the condensation of a phenol and an aldehyde. The phenol is one which is capable of electrophilic aromatic substitution, e.g., phenol itself, resorcinol, catechol, p-aminophenol, etc. The aldehyde reactant includes principally formaldehyde, acetaldehyde butyaldehyde and the like. Both resole and novolac phenolaldehyde resins are contemplated.

Additionally, the binder usually comprises an elastomer, which includes both natural and synthetic rubbers. Most often this elastomer is a nitrile rubber, i.e., a copolymer of butadiene and acrylonitrile. Generally, the acrylonitrile content of such copolymer will range from about 20% to about 50%, and small proportions of other monomers such as acrylic acid, methacrylic acid and itaconic acid may be present. Nitrile rubbers are described more particularly in the Vanderbilt Rubber Handbook (1968), pp. 99–118 (Nitrile Elastomers).

Other elastomers may of course be used, including natural rubber which is principally the homopolymer of isoprene; also, the various synthetic rubbers resulting from polymerization and copolymerization of butadiene, isoprene, chloroprene, cyclopentadiene, and dicyclopentadiene. An especially preferred synthetic rubber is that known as SBR, viz., a copolymer of styrene and butadiene.

The cross-linkable polymeric binder materials are used in an amount within the range of from about 15 to about 30 parts based on the total weight of friction material. The total amount of polymeric material, including friction modifiers, will comprise from about 20 to about 60 parts, on the same basis.

The friction modifying material may be any of a wide variety of materials including both organic and inorganic compounds. Typical organic materials include a cured, cross-linked phenol-aldehyde resin where the phenol is the alkenyl phenol derived from cashew nut shell liquid (CNSL). Other similar resins are also contemplated. Inorganic materials include barium sulfate, ion oxide, metallic particles, copper oxide, antimony sulfide, lead sulfide, zinc sulfide, zinc oxide, sodium fluoride, coke, graphite, molybdenum sulfide, and the like. Generally, mixtures of these friction modifying materials are used. They are effective to cause a satisfactory stabilization of the coefficient of friction over a wide range of temperature.

The amount of friction modifying material is within the range of from about 10 to about 70 parts.

The asbestos-free friction materials of the present invention may also contain minor proportions of a polymeric aromatic polyamide instead of some of the glass fiber. The presence of such aromatic polyamide is effective to reduce wear.

The friction materials of the present invention are prepared from short lengths of glass fibers, i.e., those having from about 0.1 inch to about 6.0 inches, preferably from about 0.2 inch to about 1.0 inch. Alternatively, continuous glass fiber, random wound into a preform donghnat (to provide good burst strength), as in U.S. Pat. No. 4,118,528 (Lowry), may be used. These are coated with an "RFL" composition. The term "RFL" is used herein is intended to mean and include the dried residue of a coating composition which contained a natural rubber and/or a synthetic hydrocarbon chain rubber and a phenolic resin. The coating composition comprises the elastomer in latex form, and the phenolic resin in aqueous solution. Typical methods and ingredients for preparing RFL-coated glass fibers are taught in U.S. Pat, Nos. 2,691,614; 2,822,311; 3,973,071; and 3,925,286.

Glass fibers (0.5 inch) having the composition of Nos., 1, 2 and 3 above, and that of a commercially available glass (Moh's hardness; 6), indentified in Table I as No. 4, are mixed with the following ingredients to form friction materials:

|  | Parts by Weight | |
|---|---|---|
|  | Comp. A | Comp. B |
| Rubber[1] | 16.5 | 15.7 |
| Phenolic resin[2] | 8.6 | 8.2 |
| Friction modifiers | 32.5 | 31.1 |
| Cashew granules[3] | 15.3 | 14.6 |
| ⅛" Glass fiber[4] | 20.4 | 30.4 |
| ⅛" Aromatic polyamide fiber | 6.8 | — |
| Rubber solvent |  | 20 ml. |
| Methyl ethyl ketone | 50 ml. |  |

[1] An acrylonitrile-butadiene copolymer, SBR, etc.
[2] A thermosetting resin prepared by the reaction of phenol and formaldehyde in the presence of an acid catalyst until a reversible, fusible thermoplastic product is obtained, which then is mixed with hexamethylene tetramine
[3] Reaction product of cashew nut shell liquid (an alkenyl phenol) and formaldehyde.

Each of the eight friction materials thus formulated is mixed, the solvent evaporated, then molded under pressure at 350° F. for 20 minutes into 1⅛"×¼" specimens. The specimens then were cured at 400° F. for four hours and then tested on a Chase machine (See SAE Report 670510, May, 1967). To simulate clutch service conditions, a continuous 90-minute Chase test is run at a friction force of 5.1 lbs. The temperature is increased to 600° F. for 30 minutes, and then cooled to about 110° F. in 30 minutes, for a total test time of 90 minutes. The data is shown in Table I.

| Test Specimens | | | | | | |
|---|---|---|---|---|---|---|
|  |  |  | Friction | | Vibration | |
| Glass | Average Friction | Wear Inches | At 515° F. | After 90 Min. | Cold | Hot |
| 1A | 0.556 | 0.0034 | — | 0.35 | light | smooth |
| 1B | 0.540 | 0.0035 | 0.45 | 0.30 | med. | smooth |
| 2A | 0.546 | 0.0046 | 0.55 | 0.32 | med. | smooth |
| 2B | 0.457 | 0.0034 | 0.50 | 0.32 | med. | smooth |
| 3A | 0.492 | 0.0050 | 0.40 | 0.25 | heavy | med. |
| 3B | 0.423 | 0.0030 | 0.50 | 0.30 | smooth | smooth |
| 4A | 0.647 | 0.0044 | 0.30 | 0.30 | heavy | heavy |
| 4B | 0.685 | 0.0027 | 0.40 | 0.24 | heavy | heavy |

It will be noted that those test specimens (Nos. 1-3) containing glass fibers of relatively low hardness, i.e., below about 5 on the Moh's hardness scale, exhibited less vibration than the specimen (No. 4) containing glass fibers of relatively high hardness, i.e., a Moh's hardness rating of 6. Moreover, friction and wear characteristics of these test specimens containing the softer glass fibers are satisfactory.

All parts and percentages herein, unless otherwise expressly stated, are by weight.

I claim:

1. An asbestos-free friction mateial comprising in combination (1) an effective proportion of a fibrous glass having a Moh's hardness rating of less than about 5, (2) from about 15 to about 30 parts of a binder and (3) from about 10 to about 70 parts of a friction modifying material, all parts based on the weight of the asbestos-free friction material.

2. The asbestos-free friction material of claim 1 wherein the fibrous glass is a lead-free glass.

3. The asbestos-free friction material of claim 1 wherein the binder includes a phenolic resin.

4. The asbestos-free friction material of claim 1 wherein the fibrous glass contains lead.

5. The asbestos-free friction material of claim 4 wherein the fibrous glass contains up to about 70% of lead.

6. An asbestos-free friction material comprising in combination (1) an effective proportion of a fibrous, lead-free glass comprising from about 45% to about 75% of silicon dioxide, from about 15% to about 30% of potassium oxide and from about 2% to about 10% of magnesium oxide, (2) from about 15 to about 30 parts of a binder, and (3) from about 10 to about 70 parts of a friction-modifying material, all parts based on the weight of the asbestos-free friction material.

7. The asbestos-free friction material of claim 6 wherein the binder includes a phenolic resin.

8. The asbestos-free friction material of claim 6 wherein the fibrous, lead-free glass additionally contains up to about 25% of boron oxide.

9. The asbestos-free friction material of claim 6 wherein the fibrous, lead-free glass additionally contains up to about 10% of zinc oxide.

10. The asbestos-free, friction material of claim 6 wherein the lead-free glass has a density below about 30.

* * * * *